United States Patent
May et al.

(10) Patent No.: US 11,425,158 B2
(45) Date of Patent: Aug. 23, 2022

(54) DETERMINATION OF A SECURITY RATING OF A NETWORK ELEMENT

(71) Applicant: Fortinet, Inc., Sunnyvale, CA (US)

(72) Inventors: Robert A. May, North Vancouver (CA); Tarlok Birdi, Port Moody (CA)

(73) Assignee: Fortinet, Inc., Sunnyvale, CA (US)

( * ) Notice: Subject to any disclaimer, the term of this patent is extended or adjusted under 35 U.S.C. 154(b) by 441 days.

(21) Appl. No.: 16/358,433

(22) Filed: Mar. 19, 2019

(65) Prior Publication Data

US 2020/0304533 A1 Sep. 24, 2020

(51) Int. Cl.
*H04L 9/40* (2022.01)

(52) U.S. Cl.
CPC ...... *H04L 63/1433* (2013.01); *H04L 63/0853* (2013.01); *H04L 63/20* (2013.01)

(58) Field of Classification Search
CPC .. H04L 63/0853; H04L 63/1433; H04L 63/20
USPC .......................................................... 726/1
See application file for complete search history.

(56) References Cited

U.S. PATENT DOCUMENTS

2018/0139205 A1* 5/2018 Devaney ............... H04L 63/101

* cited by examiner

*Primary Examiner* — Anthony D Brown
(74) *Attorney, Agent, or Firm* — HDC Intellectual Property Law, LLP

(57) ABSTRACT

Systems and methods for a security rating framework that translates compliance requirements to corresponding desired technical configurations to facilitate generation of security ratings for network elements is provided. According to one embodiment, a host network element executes a collection of security checks on at least a first network element. The execution is performed by receiving configuration data of the first network element pertaining to each security check of the collection of security checks in response to a request by the host network element and validating each security check by comparing the received configuration data pertaining to each security check with a pre-defined or configurable network security configuration recommendation to generate a compliance result. Further, the host network element generates a compliance report by aggregating the compliance results obtained by executing each security check of the collection of security checks.

21 Claims, 11 Drawing Sheets

DETERMINATION OF A SECURITY RATING OF A NETWORK ELEMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network security. In particular, embodiments of the present invention relate to monitoring of network elements associated with a network (e.g., network security devices of an enterprise network) to determine a security rating of each network element by taking in business level security, risk and compliance requirements, translating those requirements into technical configurations and conveying measurable and meaningful diagnostics on the current state and progress of their security.

Description of the Related Art

With rapid increase in networking, network and security teams of various organizations face rapidly mutating threats at every possible point of entry. Network security management has become far more challenging and complex than just a few years ago. Network and security teams are required to comply with various internal and external mandates/standards developed based on best practices currently in use in the industry, which provide measures to prevent, detect, and correct network compromises.

As complex enterprise networks shift to meet evolving business needs specific to the enterprise, configurations and policies are dynamically changed and enforced. Therefore, security mandates/standards are developed in a rapid fashion. Enterprises invest tremendous amounts of time, effort and money in complying with these requirements, thereby adding to enduring pressure on the network and security teams. However, due to lack of knowledge to interpret mandates/standards, introduction of errors in compliance becomes inevitable. Furthermore, enterprise customers are currently required to perform a manual mapping of compliance requirements to controls (e.g., the processes and/or mechanisms, such as the technical configurations of the network security device at issue) that are designed to meet the requirements.

Enterprise customers currently lack the ability to monitor the network security posture of their enterprise network over time or compare their network security posture to industry peers, for example. At present, to the extent the enterprise customers wanted to attempt to assess a single network element (of potentially tens or more of such devices) for compliance with a particular standard at a particular point in time, the customer would have to manually print out or otherwise extract device configurations from the network element at issue and try to compare the configurations against the requirements of the particular standard. Even this simple sounding undertaking, would require expert knowledge of the standards and the ability to interpret the control/audit objective of each requirement. Additionally, the customer would need to have expert knowledge regarding the networking device at issue and how each audit objective is configured and tested on each networking device. Even if a customer were somehow able to successfully manually assess the compliance of one network element within the enterprise network, for a full picture, this process would have to be repeated for all network elements within the enterprise network. Assuming the enterprise customer had this full picture, the enterprise customer would still lack needed context as there is no existing mechanism to provide the enterprise customer with feedback, for example, by comparing their network security posture and maturity against peers.

In view of the foregoing, there exists a need for a new paradigm, which continually assesses elements of a network for their compliance with mandates/standards in terms of security ratings in order to validate that configurations are working effectively, and to provide awareness of risks and vulnerabilities, which may impact daily business operations. Such a paradigm may aid in improving network configurations, enhance effectiveness of risk mitigation techniques and facilitate comparison among peers.

SUMMARY

Systems and methods are described for a security rating framework that translates compliance requirements to corresponding desired technical configurations to facilitate generation of security ratings for network elements. According to one embodiment, a host network element of multiple network elements associated with an enterprise network and communicatively coupled with each other via a security fabric, executes a collection of security checks on at least a first network element of the multiple network elements. The execution is performed by receiving configuration data of the first network element pertaining to each security check of the collection of security checks via the security fabric in response to a request by the host network element sent via the security fabric and validating each security check by comparing the received configuration data pertaining to each security check with a pre-defined or configurable network security configuration recommendation to generate a compliance result. Further, the host network element generates a compliance report by aggregating the compliance results obtained by executing each security check of the collection of security checks.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
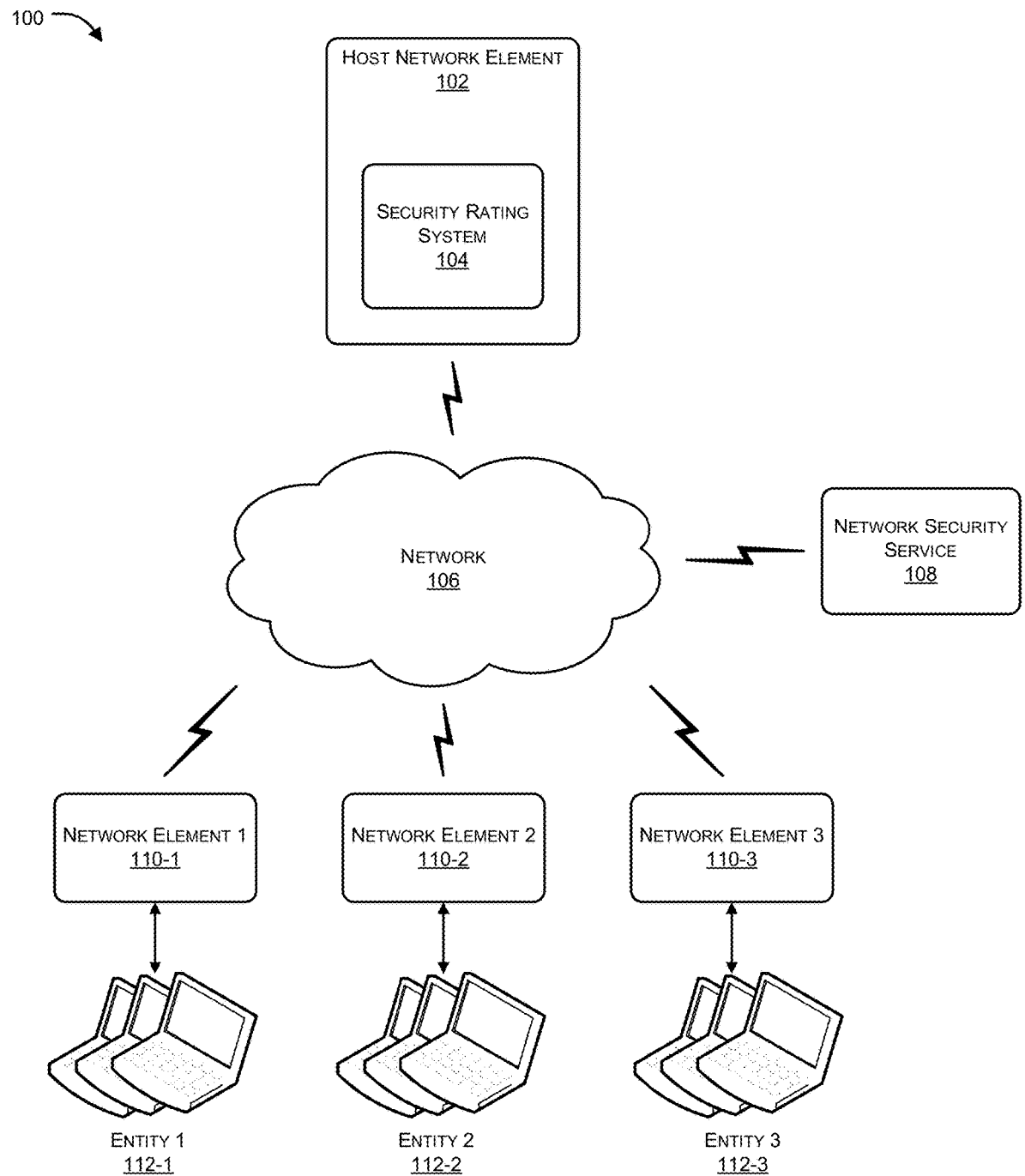
FIG. 1 illustrates an exemplary network architecture in which or with which embodiments of the present invention can be implemented.

Systems and methods are described for continuously monitoring plurality of network elements to determine security rating of each network element. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "security fabric" refers to a combination of hardware and software elements of a network that deliver protection and visibility to multiple network segments, devices, and appliances. The devices and appliances may be physical, virtual, in the cloud, or on-premises. The security fabric may also provide the ability to automatically synchronize security resources to enforce policies, coordinate automated responses to threats detected in the network, and easily manage different security solutions and products through a single console.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying embodiments of the present invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment of the present invention. Those of ordinary skill in the art further understand that the exemplary hardware, software, processes, methods, and/or operating systems described herein are for illustrative purposes and, thus, are not intended to be limited to any of those named.

While embodiments of the present invention are illustrated and described herein, it will be clear that the invention is not limited to these particular embodiments. Numerous modifications, changes, variations, substitutions, and equivalents will be apparent to those skilled in the art, without departing from the spirit and scope of the invention, as described in the claims.

According to an aspect of the present disclosure, a host network element can execute a collection of security checks on at least a first network element. The host network element and the first network element can be part of multiple network elements associated with a network that are communicatively coupled with each other via a security fabric. In order to commence execution of the collection of security checks, the host network element can issue a request to the first network element via the security fabric and in response to the request, the first network element can provide configuration data pertaining to each security check (which may also be referred to herein simply as a check, hereinafter) of the collection of security checks via the security fabric.

Having obtained the configuration data corresponding to each security check of the collection of security checks, the host network element can proceed to validate each security check by comparing the corresponding configuration data with a pre-defined or configurable network security configuration recommendation to generate a compliance result. Compliance results can be collected in a native format that is common across all enterprises subscribing to a security service ("subscribing enterprises"), thereby facilitating comparison between and among subscribing enterprises as described further below and allowing reports to be run against the common format, which can be translated to different "compliance" formats—Center for Internet Security (CIS), Payment Card Industry (PCI), General Data Protection Regulation (GDPR), International Organization for Standardization (ISO), National Institute of Standards and Technology (NIST), Health Insurance Portability and Accountability (HIPAA), etc.

The pre-defined or configurable network security configuration recommendation can be derived by translating any or a combination of security, business, internal and/or external audit and compliance requirements or best practices into a desired technical configuration for various security functions, including, but not limited to, audit logging and monitoring, web application security, threat and vulnerability management, security fabric hardening, network design and policy, firmware and subscriptions, endpoint management, data protection, and application security.

The host network element can then generate a compliance report representing the network element's compliance with the collection of security checks. In one embodiment, the compliance report is generated by aggregating the compliance results obtained for each security check of the collection of security checks. Non-limiting examples of various security checks are provided in the attached Appendix.

According to an embodiment, the compliance report for each network element of an enterprise network can be provided to a network security service operatively coupled with the host network element. The network security service can perform statistical analysis on the compliance reports for each network element to compute a security rating score pertaining to security compliance of each network element individually and/or the enterprise network as a whole. In one embodiment, based on the overall compliance results for an enterprise network, security rating scores can be generated for enterprises subscribing to the security service ("subscribing enterprises") by comparing each subscribing enterprise to each other (e.g., globally, per-region, per-industry, per-compliance sector, etc.). In this manner, subscribing enterprises can be made aware of how their security posture measures up relative to others in similar or different circumstances.

FIG. 1 illustrates an exemplary network architecture 100 in which or with which embodiments of the present invention can be implemented. In the context of the present example, a security rating system 104 (which may be referred to simply as system 104, hereinafter) is implemented within a host network element 102. Host network element 102 can be selected from multiple network elements 110-1, 110-2 and 110-3 (which may be collectively referred to herein as network elements 110 and may be individually referred to herein as network element 110) associated with a network 106 and communicatively coupled with each other via a security fabric. Network element 110 can be any computing device, network device, or network appliance, for example, network element 110 can include, but is not limited to, server, a storage device, or other computing device including a Central Processing Unit (CPU) or any hardware that could perform computation such as a Graphics Processing Unit (GPU), a Field-Programmable Gate Array (FPGA), an Application-Specific Integrated Circuit (ASIC), and the like.

In the context of the present simplified example, architecture 100 can include multiple entities 112-1, 112-2 and 112-3 (which may be collectively referred to herein as entities 112 and may be individually referred to herein as entity 112), which can be considered as clients of network 106. Entities of network 106 (e.g., an enterprise network) can interact using the computing devices, which can include but are not limited to personal computers, smart devices, web-enabled devices, hand-held devices, laptops, mobile phones and the like. Those skilled in the art will appreciate that, network 106 in architecture 100 can include one or more wireless networks, wired networks or a combination thereof that can be implemented as one of the different types of networks, such as Intranet, Local Area Network (LAN), Wide Area Network (WAN), Internet, and the like. Further, network 106 can either be dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an aspect of the present disclosure, system 104 can build an internal network topology to determine network elements 110 that require a compliance report and can execute a collection of security checks on such network elements 110. For execution of a collection of security checks, system 104 can request network element 110 for configuration data via the security fabric by assigning a unique authentication token with each request, which can be sent back by network element 110 to system 104 with the configuration data. In response to the request, system 104 can receive the configuration data of network element 110 pertaining to each security check of the collection of security checks via the security fabric. Alternately, the configuration data of network element 110 can be received when network element 110 generates a security rating request and provides the security rating request to system 104. Further, system 104 can validate each security check by comparing the received configuration data pertaining to each security check with a pre-defined or configurable network security configuration recommendation to generate a compliance result. The pre-defined or configurable network security configuration recommendation can be derived by translating any or a combination of one or more of security, business, audit and compliance requirements into a desired technical configuration.

According to an embodiment, system 104 can execute a collection of security checks in batches. Further, each security check of the collection of security checks can be associated with a dependency so that system 104 can serially execute the security checks based on the associated dependency.

Furthermore, system 104 can generate a compliance report by aggregating the compliance results obtained by executing each security check of the collection of security checks. The compliance report for a set of one or more network elements 110 can be provided to a network security service 108 (e.g., a cloud-based security service, such as the FordGuard security service available from the assignee of the present invention) operatively coupled with host network element 102 such that the network security service 108 can perform statistical analysis on the submitted compliance report(s) of each network element 110 to compute a security rating score pertaining to the security compliance of the set of network elements 110 (e.g., representing a subset or all network elements of an enterprise network) relative to other subscribing entities. The compliance report can be generated on completion of the execution of each batch of the security checks or a comprehensive compliance report can be generated when execution of all batches of security checks is completed.

Although in various embodiments, the implementation of system 104 is explained with respect to host network element 110, those skilled in the art will appreciate that, system 104 can be fully or partially implemented in network security service 108, network elements 110 or other computing devices operatively coupled with network 106 with minor modifications, without departing from the scope of the present disclosure.

Those skilled in the art will appreciate that, system 104 can provide measurable and meaningful feedback to a network administrator, technical staff or business people, for example, regarding the security posture of network elements 110. For business people, the security posture may be expressed in terms of measurable and meaningful diagnostics on the current state and progress overtime of the enterprise's security. In this manner, management can track the state of network security overtime in business asset terms and compare themselves against industry peers as discussed further below. For technical staff the security posture may be expressed in the form of actionable network security configuration recommendations, and key performance/risk indicators, so that entities 112 can verify configurations and remediate critical issues with ease. Further, entities 112 can continuously track their security roadmap and target security maturity level by sending security rating requests to host network element 102. Computation of a security rating score pertaining to security compliance of each network element 110 and the enterprise network as a whole can aid entities 112 in connection with tracking the state of network security and comparing themselves against industry peers, for example. As pre-defined or configurable network security configuration recommendations can be derived by translating security, business, audit and compliance requirement into a desired technical configuration, system 104 can be enabled to map a tailored plan for addressing risks in a controlled and adoptable manner for specific entity 112 or a group of entities 112. Embodiments of the present disclosure can also aid in building up confidence of senior management by demonstrating effective business asset protection. Management can provide meaningful business impacting information, industry trends and cost/risk indicators for computation of network security configuration recommendations. Security ratings and security compliance can be used by the management to consider possible options to further reduce costs/risks increase revenue/services by leveraging advanced technologies.

Figure 2A:
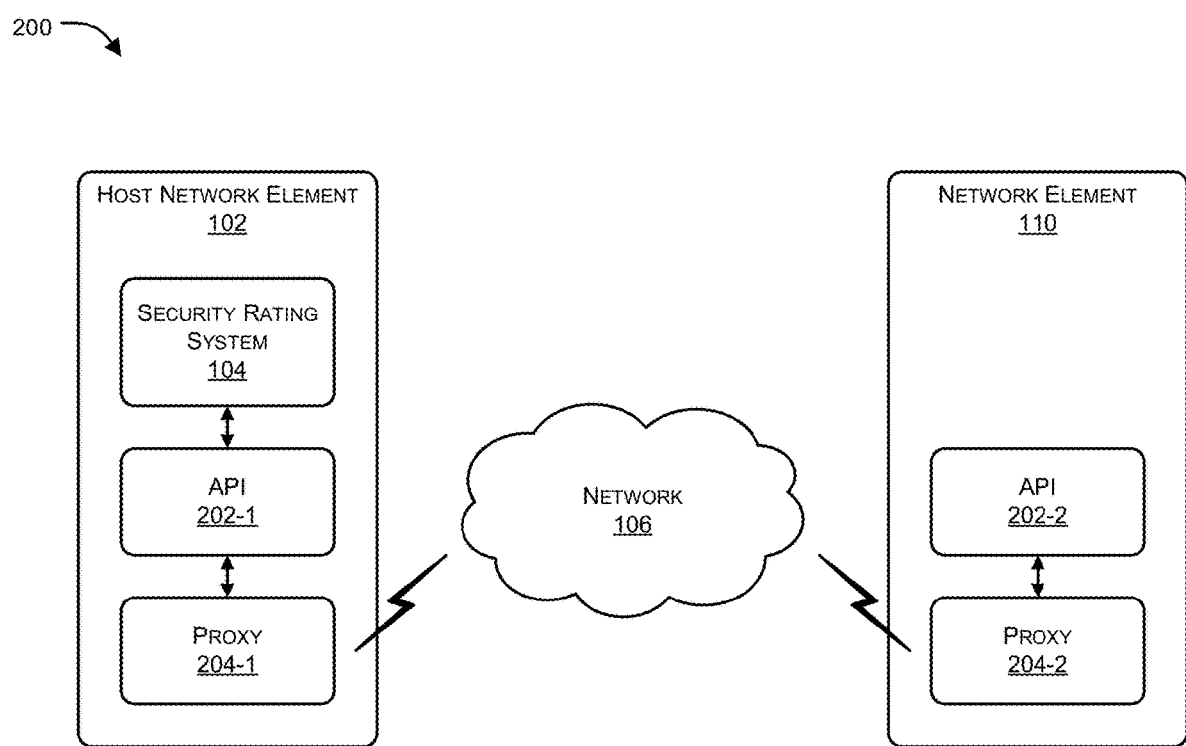
FIGS. 2A-B illustrate exemplary functional components of a host network element in accordance with an embodiment of the present invention.
Figure 2B:
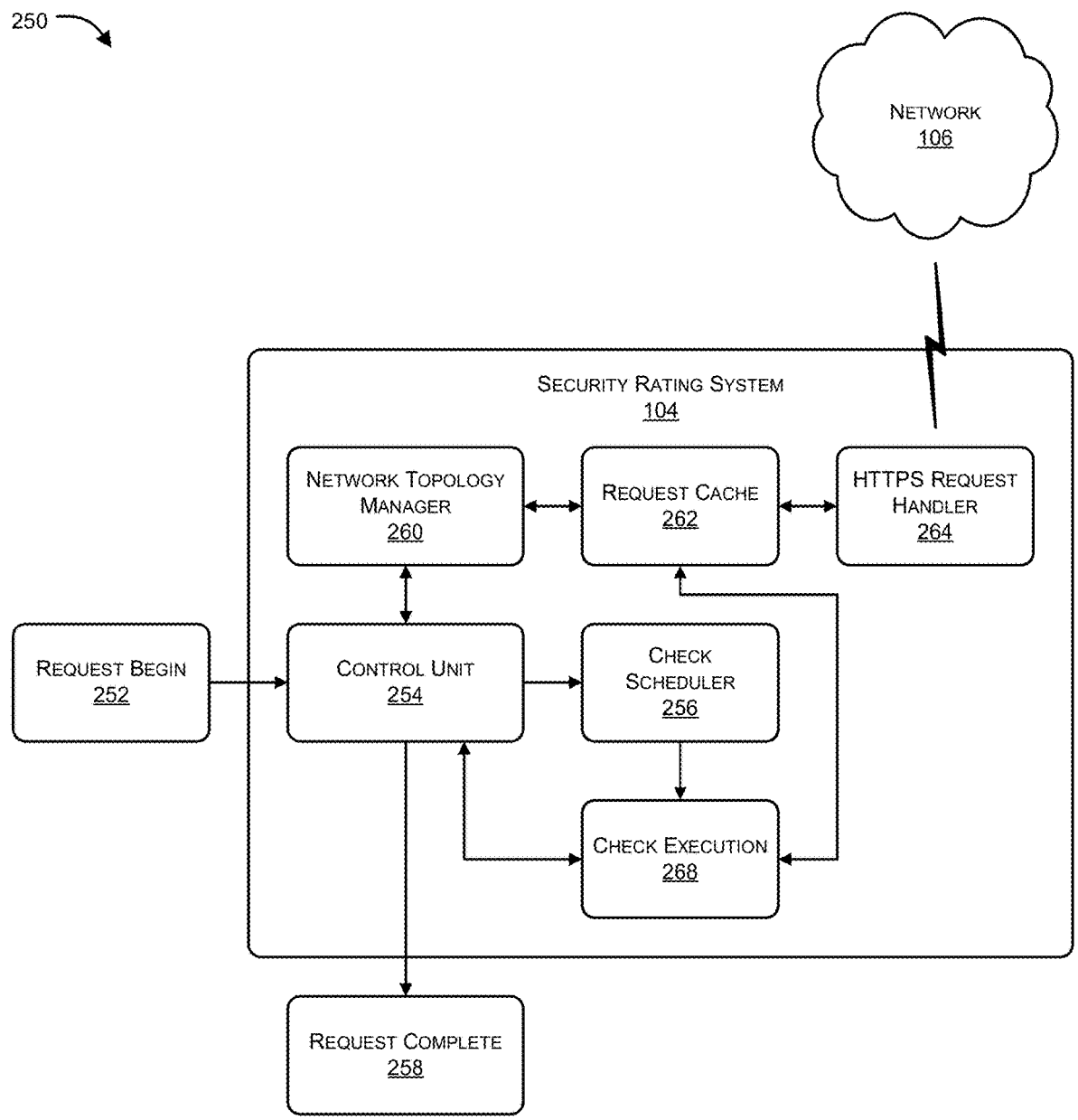

FIGS. 2A-B illustrate exemplary functional components of a host network element 102 in accordance with an embodiment of the present invention. Referring to exemplary network architecture 200, system 104 can verify security compliance of multiple network elements 110 (for simplicity, only one network element is shown in FIG. 2A), which are associated with network 106 and communicatively coupled with each other via a security fabric, from host network element 102. Each network element can include an application programming interface (API) 202-2 and a proxy 204-2. For verification of security compliance, system 104 implemented in host network element 102 can request network element 110 for configuration data. API 202-1 and proxy 204-1 of host network element 102 and API 202-2 and proxy 204-2 can as intermediaries for requests from host network element 102 seeking configuration data from network element 110. Using API 202-1 and proxy 204-1, host network element 102 can manage secure tunnels with other network elements 110. The tunnels can allow host network element 102 to proxy network requests to an individual network element 110 on network 106. A collection of security checks, which each enforce a security standard, can be verified against each network element 110 of network 106. On receiving the configuration data, each security check can be validated by comparing the received configuration data pertaining to each security check with a pre-defined or configurable network security configuration recommendation to generate a compliance result. Compliance results for each check can then be aggregated and summarized for each network element 110 into a compliance report. Further, the compliance report can be provided to a cloud service, e.g., a network security service operatively coupled with host network element 102 so that the network security service can perform statistical analysis on the compliance report of each network element 110 to compute security rating score, e.g., a percentile score pertaining to security compliance of each network element with respect to other network elements in the same network, with respect to similar network elements in networks of other subscribing enterprises, or with respect to similar network elements in networks of other subscribing enterprises meeting certain criteria (e.g., relating to size, revenue, geography, industry, compliance sector and the like).

Referring to network architecture 250 along with network architecture 200, a security rating process can be initialized by system 104. During initialization, system 104 can send initialization data through a HyperText Transfer Protocol Secure (HTTPS) request handler 264. HTTPS request handler 264 can assign a unique authentication token for each request of a collection of requests such that the initialization data can include the authentication token, which can be proxied back to HTTPS request handler 264 when configuration data pertaining to the request is received. Further, all the request can be stored in request cache 262 so that future requests for the same configuration data can be served faster.

According to an embodiment, a network element 110 can generate a security rating request to request handler 264. In response, an internal network topology can be built by network topology manager 260. To build the internal network topology, network topology manager 260 can determine which network elements can be included in the security rating process and which of the network elements require a compliance report.

In an embodiment, a control unit 254 can execute the collection of security checks on network element 110 using a check scheduler 256 and a check execution 268 such that each request begins 252 and completes 258 at control unit 258. Those skilled in the art will appreciate that, the security checks can be scheduled on network element 110 in batches. Further, some security checks can be dependent upon validation of other security checks, e.g., if a security check did not pass validation, any security check that has a dependency on the security check cannot be executed. Therefore, execution of security checks may be required to be scheduled in a compatible order so that security checks that are associated with dependencies are executed serially based on the associated dependencies. Check scheduler 256 can maintain the schedule for security checks.

In an embodiment, check execution 268 performs execution of security checks by consecutively executing each batch of security check. When each request begins 252, in response to request by HTTPS request handler 264, the received configuration data of the network element pertaining to each security check can be provided to check execution 268. Each security check can be validated by comparing the received configuration data pertaining with a pre-defined or configurable network security configuration recommendation to generate a compliance result. The pre-defined or configurable network security configuration recommendation can be derived by translating any or a combination of security, business, audit and compliance requirement into a desired technical configuration. The compliance result of the security check can be a pass, fail, or exempted based on how the configuration data is compared with the desired security configuration. Upon request completion 258 of each security check, the compliance result can be aggregated to the completion report.

Figure 3A:
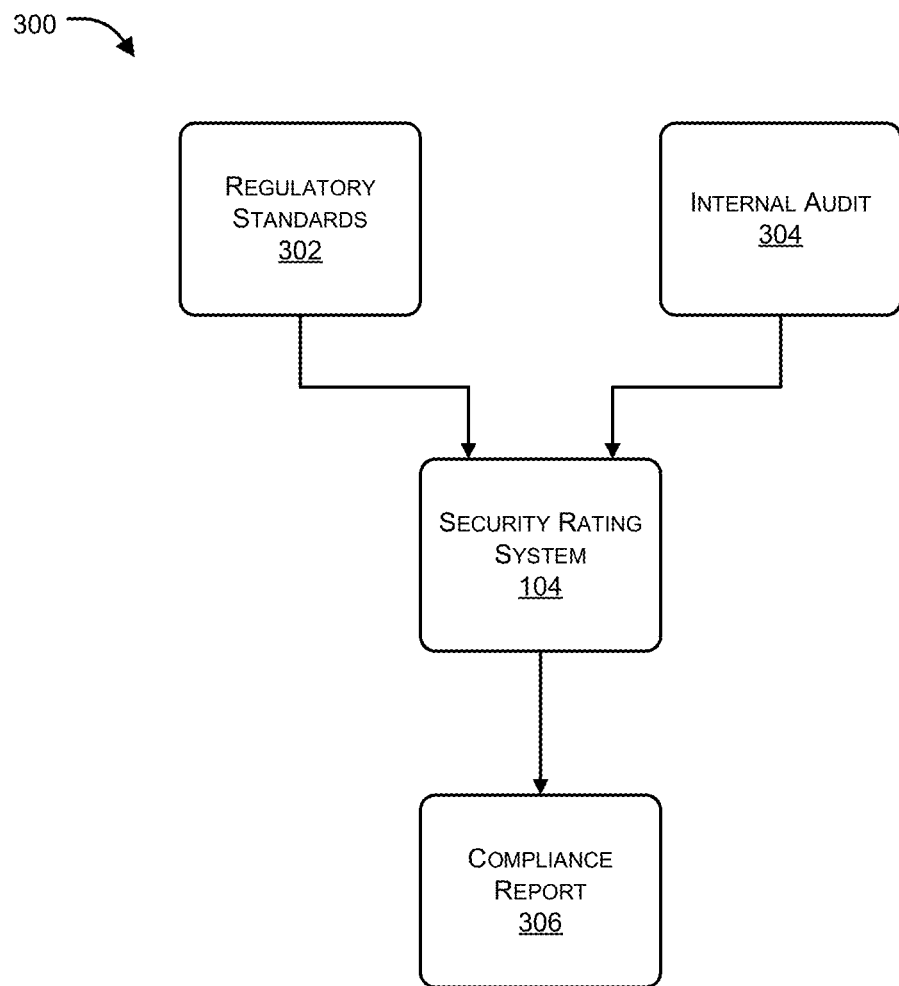
FIGS. 3A-C conceptually illustrate exemplary implementations of a security rating system in accordance with embodiments of the present invention.
Figure 3B:
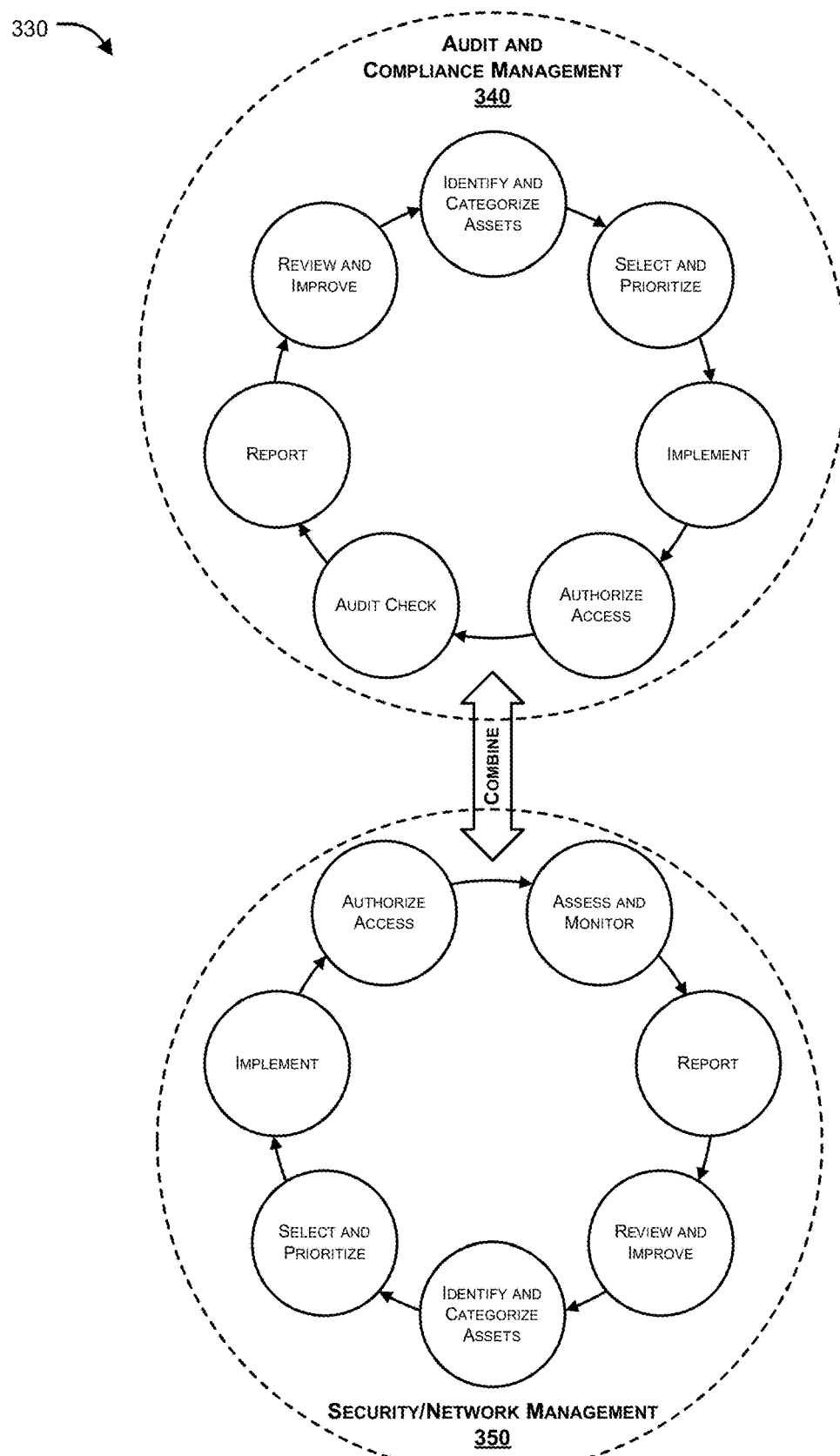
Figure 3C:
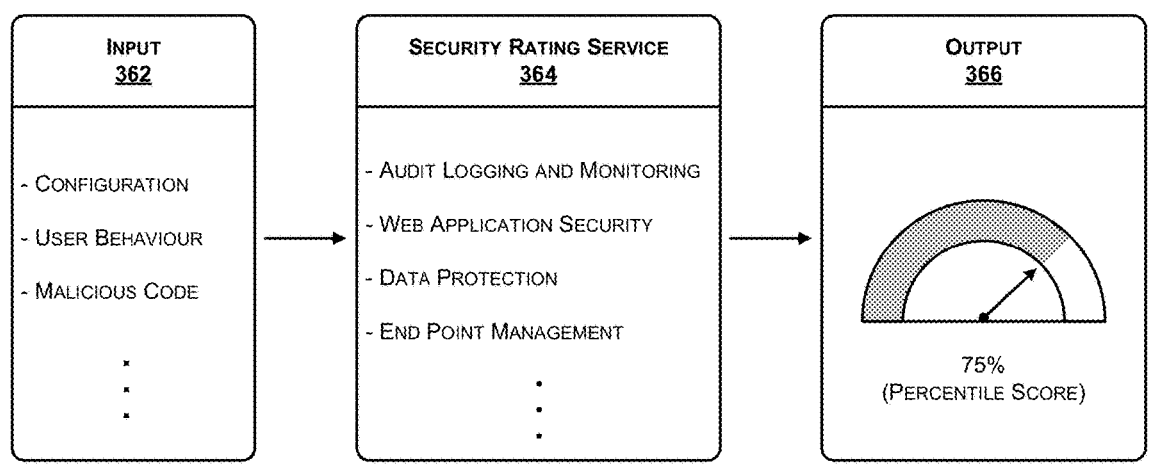

FIGS. 3A-C conceptually illustrate exemplary implementations 300, 330 and 360 of a security rating system 104 in accordance with embodiments of the present invention. Referring to representations 300 and 330, security rating system 104 can perform data collaboration and automation to define network security configuration recommendation. The system can collect, evaluate and translate large amounts data from various devices communicatively coupled with a security fabric to generate a network security configuration recommendation. In an example, the network security configuration recommendation can be uniquely defined for each user or each network element. System 104 can automatically translate and map the business and audit oriented requirements of industry regulations and standards into configurable technical settings for every network element that is part of the security fabric.

In an embodiment, system 104 can translate any or a combination of security, business, audit and compliance requirement into a desired technical configuration for deriving pre-defined or configurable network security configuration recommendation, which are then used to perform measureable and meaningful diagnostics in relation to the current state and progress of the security of the network element at issue or the network as a whole. For example, regulatory standards 302 and internal audits 304 can be considered and translated by system 104 into technical settings for deriving a network security configuration recommendation.

In one embodiment, a network administrator is provided with the option via a graphical user interface of the network security device at issue to choose which industry standard(s) they are interested in for purposes of evaluating compliance therewith, from a list of standards supported by the network security device. The mappings of various security fabric network element controls to specific standards requirements may be predefined by the network security device vendor within the network element code. In this manner, errors can be avoided that might be otherwise by introduced by the network administrator attempting to manually map individual compliance requirements to various technical configurations of the network security device believed to satisfy the requirements. Furthermore, this allows the network security device vendor to harmonize the list of requirements across all the selected standards and maps the relevant security fabric controls to the requirements in a consistent manner. This enables system 104 to manage complex security and risk management practices into a single integrated lifecycle by combining security/network management lifecycle 350 and audit and compliance management lifecycle 350. Thus, system 104 bridges the gap between business and audit requirements and security fabric technical controls to implement best practices.

In an embodiment, the configuration data can be compared with corresponding network security configuration recommendation to generate a compliance result for each security check. Further, aggregation of the compliance results obtained by executing each security check of the collection of security checks can be performed to generate compliance report 306. Advantageously, various embodiments of the security rating and reporting processes described herein aggregate control (i.e. technical configuration) testing results and output compliance status in real time. Furthermore, a network administrator can be provided with feedback regarding specific configuration changes that are required to address any issues identified with non-compliant controls and the enterprise customer provided with an overall compliance picture against all the selected standards and requirements Referring to representation 360, embodiments of the present disclosure, e.g. system 104, can be part of a security rating service 364. Security rating service 364 can take configuration data including network configuration, user behavior, malicious code, etc. as input 362 from a network element and can perform various security checks in batches. Exemplary batches of security checks can pertain to audit logging and monitoring, web application security, data protection, end point management, etc. Security rating service 364 can improve network configuration by supplying a network administrator with more visibility and control over the network by providing a mechanism to continually assess the security fabric, validate that configurations are working effectively, and providing awareness of risks and vulnerabilities which may impact regular operations of the network elements. In an implementation, security rating service 364 can provide output 366 indicating a security rating score pertaining to security compliance of each network element. The score can be an outcome of statistical analysis performed on the compliance report which includes an aggregation of compliance results of each security check of each batch.

Figure 4:
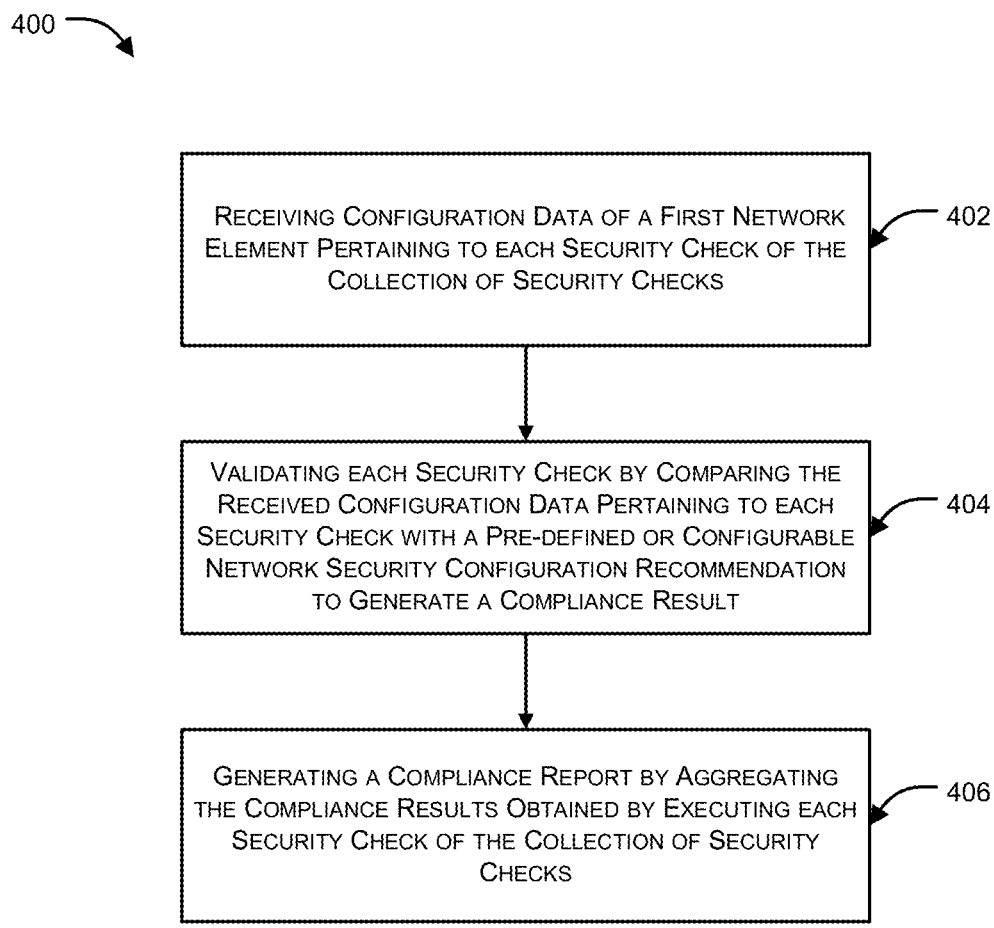
FIG. 4 is a flow diagram illustrating a method for generating a compliance report in accordance with an embodiment of the present invention.

FIG. 4 is a flow diagram 400 illustrating a method for generating a compliance report in accordance with an embodiment of the present invention. In the context of the present example, a host network element can execute a collection of security checks on at least a first network element, where the host network element and the first network element can be part of multiple network elements that are associated with an enterprise network and communicatively coupled with each other via a security fabric. The execution can commence at block 402, by receiving configuration data of the first network element pertaining to each security check of the collection of security checks. The configuration data can be received via the security fabric in response to a request by the host network element sent via the security fabric. Further, at block 404, each security check can be validated by comparing the received configuration data pertaining to each security check with a pre-defined or configurable network security configuration recommendation to generate a compliance result. Subsequently, at block 406, the host network element can generate a compliance report by aggregating the compliance results obtained by executing each security check of the collection of security checks.

Figure 5A:
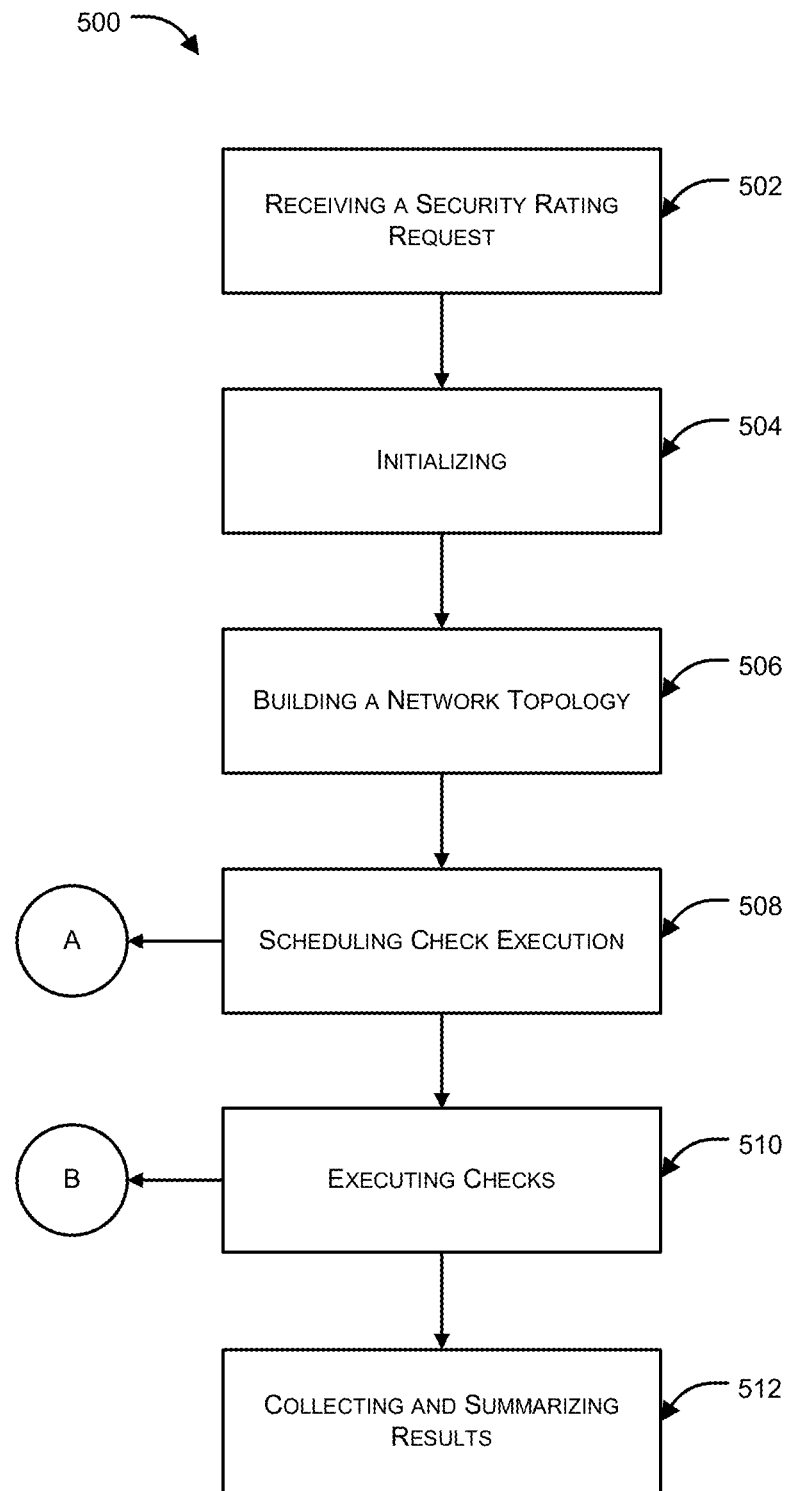
FIG. 5A-C illustrate high level flow diagrams representing exemplary processes utilized for determining security rating of a network element in accordance with an embodiment of the present disclosure.
Figure 5B:
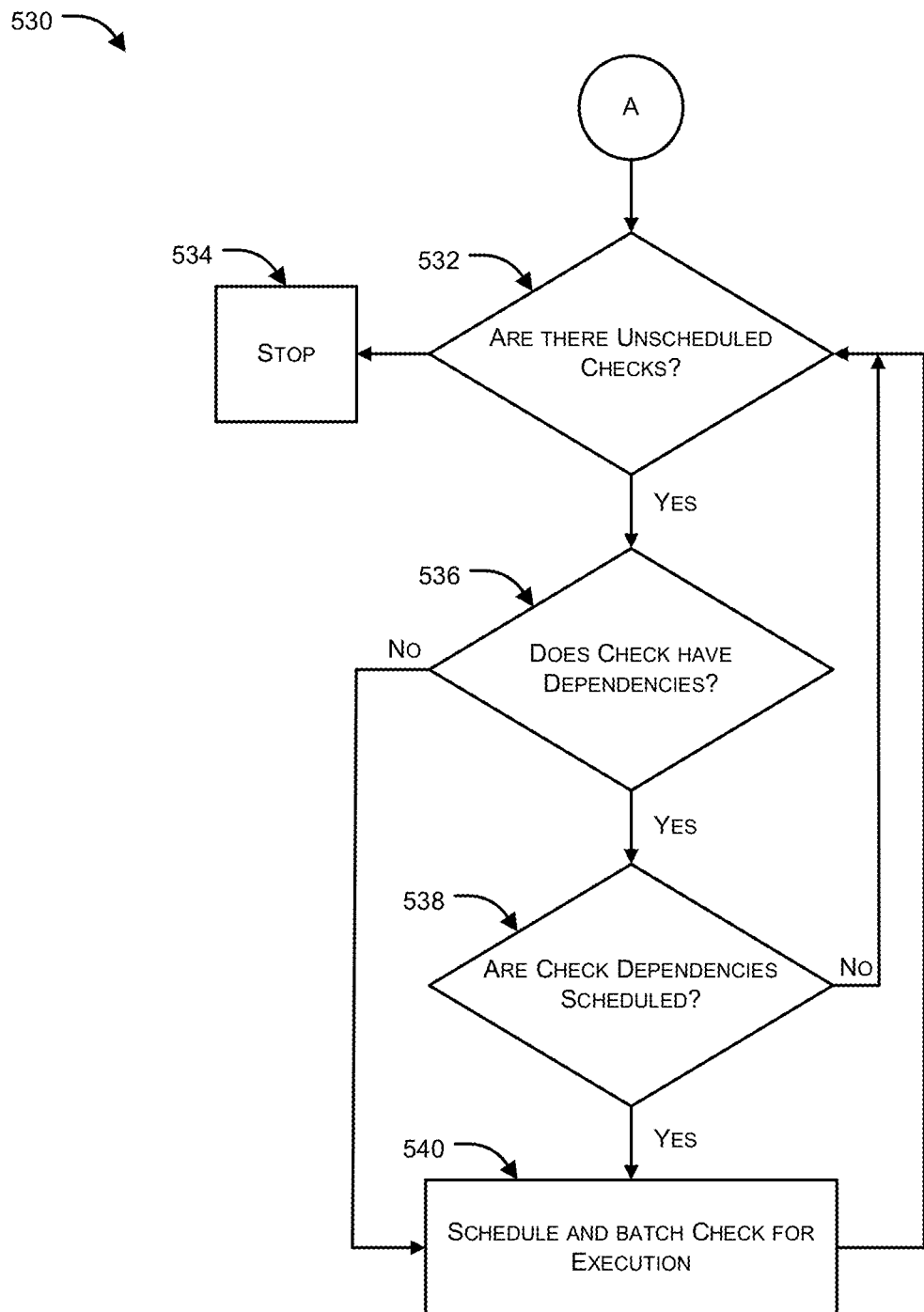
Figure 5C:
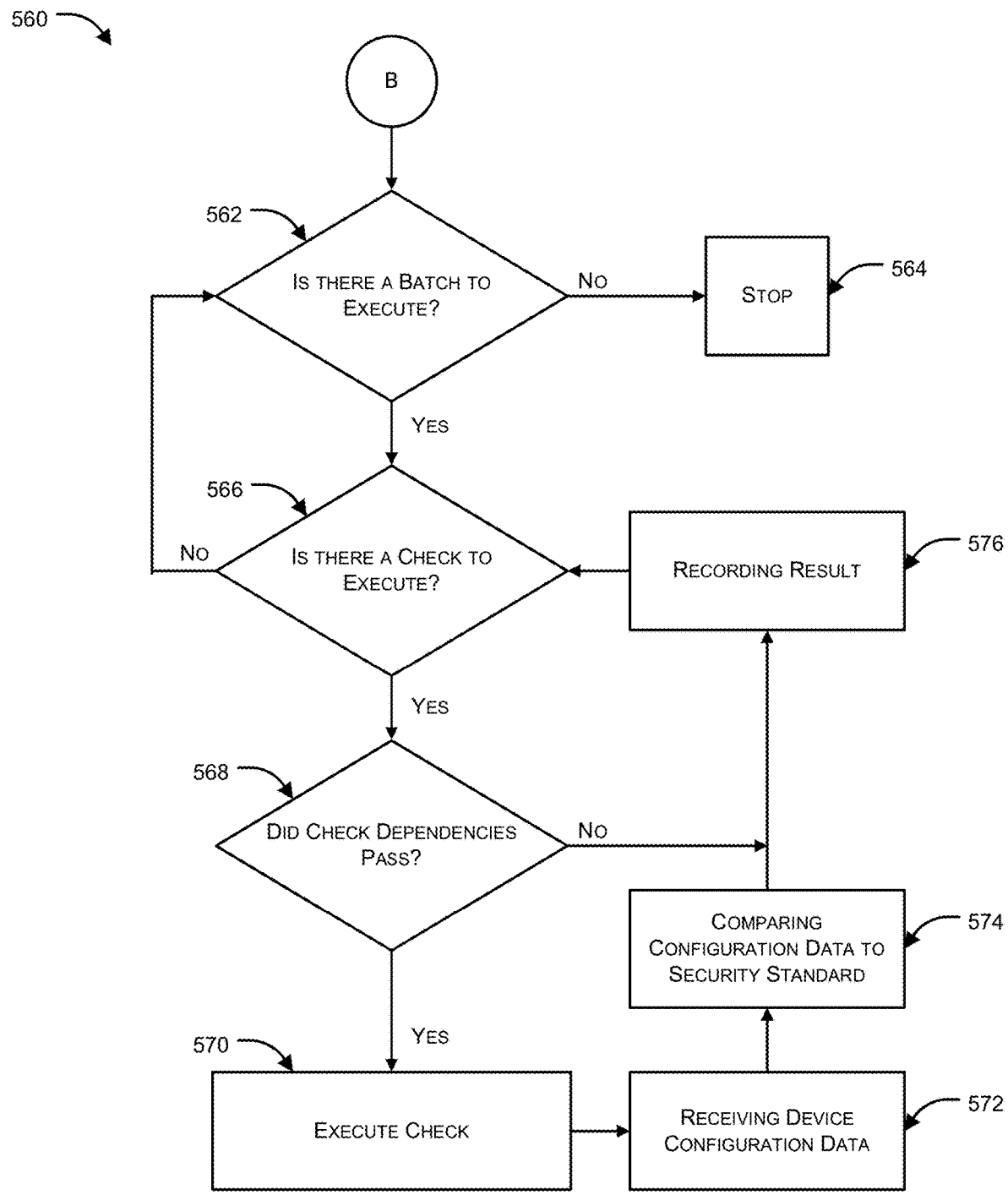

FIG. 5A-C illustrate high level flow diagrams 500, 530, and 560 representing exemplary processes utilized for determining security rating of a network element in accordance with an embodiment of the present disclosure. In the context of the present example, at block 502, the host network element can receive a security rating request from at least one network element, e.g., a first network element. The host network element and the first network element can be part of multiple network elements, which can be connected in a network and communicatively coupled with each other via a security fabric. At block 504, the host network element can perform initialization where a security rating process can be defined such that the network elements can wait for the host network element to send initialization data. The host network element can send the initialization data to the first network element that can include a unique authentication token, which can be proxied back to the host network element from the first network element.

At block 506, on receiving the initialization data, the host network element can build an internal network topology to determine the network elements that require a compliance report. The internal network topology can facilitate a determination regarding which of the network elements are to be included in the security rating.

At block 508, the host network elements can schedule check execution, which can be performed in accordance with flow diagram 530. Those skilled in the art will appreciate that checks can be scheduled for execution on the first network element in batches such that the compliance report is generated on completion of the execution of each batch of the security checks. Further, some checks can have dependency on verification of other checks, e.g., if a check did not pass validation, then any checks that are listed as having a dependency thereon cannot be executed. Therefore, those skilled in the art will appreciate the execution of the security checks should be scheduled in a compatible order. Thus, according to an embodiment, each security check of the collection of security checks can be associated with a dependency so that each security check can be executed consecutively based on the associated dependency.

In the context of the present example, at block 532, the host network element can determine if there are any unscheduled checks. If unscheduled checks are present, at block 536, the host network element can check for associated dependencies, otherwise at block 534, the process stops. If checks with associated dependencies are present, at block 538 the host network element can check if the dependencies are scheduled, otherwise at block 540, schedule and batch check for execution is performed. If dependencies are scheduled, at block 540, schedule and batch check for execution can be performed based on the scheduled dependencies, otherwise the process continues at block 532. The process is performed iteratively from block 532 to 540 until all check have been scheduled.

In the context of the present example, once the process at block 508, i.e., scheduling check execution is complete, at block 510 execution of scheduled checks is performed in accordance with flow diagram 560. Those skilled in the art will appreciate that batches of security checks can be executed consecutively. At block 562, the host entity can determine if there is a batch of security checks that is required to be executed. If there is a batch to be executed, at block 566, the host network element can check if there is a check to execute, otherwise at block 564, the process stops. If there are no checks to execute, at block 562, the process continues at block 562. However, if there is a check to execute, at block 568, the host network element can determine if the check passes the dependencies. If check does not pass the dependencies, at block 576, a result can be recorded and the process continues at block 566. However, if the check passes the dependencies, at block 570 the check is executed such that at block 572, the host network element can receive configuration data of the network element pertaining to each security and further at block 574, the host network element can compare the received configuration data with a security standard, for example, in the form of a pre-defined or configurable network security configuration recommendation derived from the security standard. Finally, at block 576, the result is recorded for the security check such that the process continues at block 566 with consecutive security check.

Finally, when the process at block 510 is complete, at block 512, collection and summarization of results is performed such that the host network element can generate a compliance report by aggregating the compliance results obtained by executing each security check.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 6:
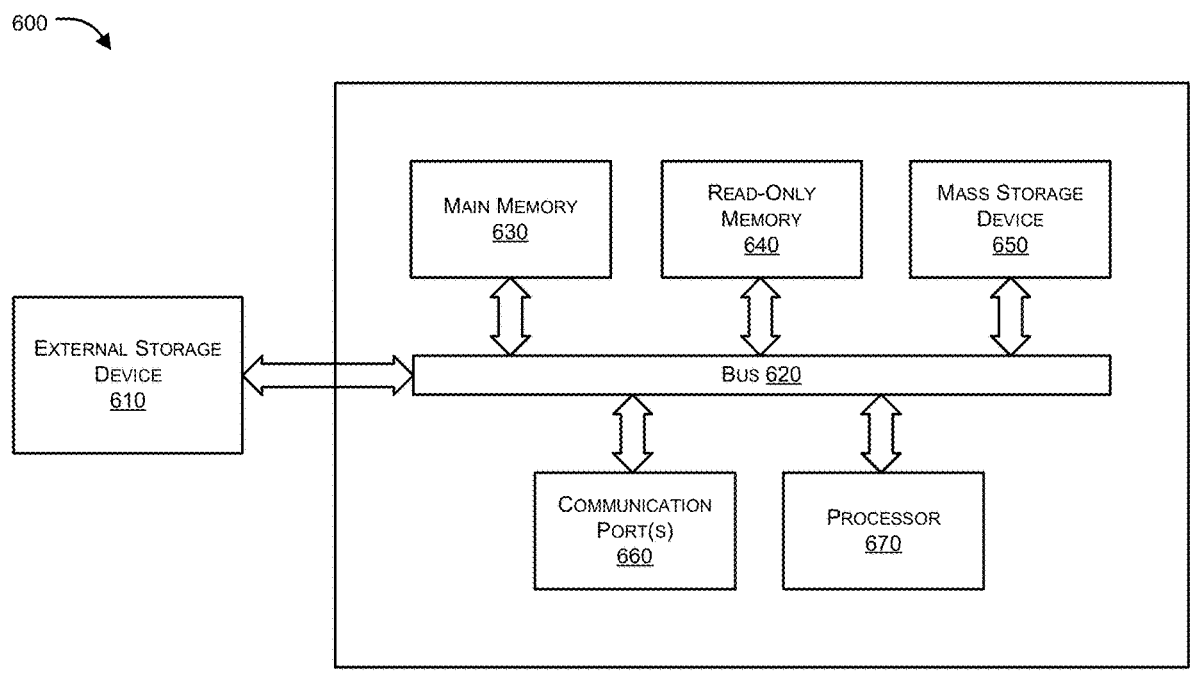
FIG. 6 illustrates an exemplary computer system in which or with which embodiments of the present invention may be utilized.

FIG. 6 illustrates an exemplary computer system 600 in which or with which embodiments of the present invention may be utilized. Computer system 600 may represent all or a portion of a host network element 102 or a computer system (e.g., a server) associated with security rating system 104. As shown in FIG. 6, computer system 600 includes an external storage device 610, a bus 620, a main memory 630, a read only memory 640, a mass storage device 650, a communication port 660, and a processor 670.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
executing, by a host network element of a plurality of network elements associated with an enterprise network of an enterprise and communicatively coupled with each other via a security fabric, a collection of security checks on at least one network element of the plurality of network elements by:
receiving configuration data of the at least one network element pertaining to each security check of the collection of security checks, wherein the configuration data is received via the security fabric in response to a request by the host network element sent via the security fabric; and
validating each security check by comparing the received configuration data pertaining to each security check with a pre-defined or configurable network security configuration recommendation to generate a compliance result; and
generating, by the host network element, a compliance report for the at least one network element by aggregating the compliance results obtained by executing each security check of the collection of security checks.

2. The method of claim 1, wherein the plurality of network elements comprise network security devices.

3. The method of claim 1, wherein a network security service to which a plurality of enterprises, including the enterprise, subscribe computes relative security rating scores for the plurality of enterprises by performing statistical analysis on compliance reports submitted by the plurality of enterprises.

4. The method of claim 3, wherein the relative security rating scores are computed by comparing those of the plurality of enterprises within one or more of a particular region, a particular industry and a particular compliance sector.

5. The method of claim 1, wherein the host network element builds an internal network topology to determine the first network element for which the compliance report is to be generated.

6. The method of claim 1, wherein the host network element assigns an authentication token with the request.

7. The method of claim 1, wherein each security check of the collection of security checks is associated with a dependency so that each security check is executed consecutively based on the associated dependency.

8. The method of claim 1, wherein the collection of security checks are executed in batches.

9. The method of claim 8, wherein the compliance report is generated on completion of the execution of each batch of the security checks.

10. The method of claim 1, wherein the host network element receives the configuration data of the first network element when the first network element generates a security rating request.

11. The method of claim 1, wherein the pre-defined or configurable network security configuration recommendation is derived by translating any or a combination of security, business, audit and compliance requirement into a desired technical configuration.

12. A non-transitory computer-readable storage medium embodying a set of instructions, which when executed by one or more processors of a host network element of a plurality of network elements associated with a network and communicatively coupled with each other via a security fabric, causes the one or more processors to perform a method comprising:
executing, a collection of security checks on at least a first network element of the plurality of network elements by:
receiving configuration data of the first network element pertaining to each security check of the collection of security checks, wherein the configuration data is received via the security fabric in response to a request by the host network element sent via the security fabric; and
validating each security check by comparing the received configuration data pertaining to each security check with a pre-defined or configurable network security configuration recommendation to generate a compliance result; and
generating a compliance report by aggregating the compliance results obtained by executing each security check of the collection of security checks.

13. The non-transitory computer-readable storage medium of claim 12, wherein the plurality of network elements comprise network security devices.

14. The non-transitory computer-readable storage medium of claim 12, wherein the host network element builds an internal network topology to determine the first network element that requires the compliance report.

15. The non-transitory computer-readable storage medium of claim 12, wherein the host network element assigns an authentication token with the request.

16. The non-transitory computer-readable storage medium of claim 12, wherein each security check of the collection of security checks is associated with a dependency so that each security check is executed consecutively based on the associated dependency.

17. The non-transitory computer-readable storage medium of claim 12, wherein the collection of security checks are executed in batches.

18. The non-transitory computer-readable storage medium of claim 17, wherein the compliance report is generated on completion of the execution of each batch of the security checks.

19. The non-transitory computer-readable storage medium of claim 12, wherein the host network element receives the configuration data of the first network element when the first network element generates a security rating request.

20. The non-transitory computer-readable storage medium of claim 12, wherein the pre-defined or configurable network security configuration recommendation is derived by translating any or a combination of security, business, audit and compliance requirement into a desired technical configuration.

21. A system, the system comprising:
   a processing resource;
   a non-transitory computer-readable storage medium coupled to the processing resource, wherein the non-transitory computer-readable storage medium embodies a set of instructions, which when executed by processing causes the processing resource to perform a method comprising:
      executing, a collection of security checks on at least a first network element of the plurality of network elements by:
      receiving configuration data of the first network element pertaining to each security check of the collection of security checks, wherein the configuration data is received via the security fabric in response to a request by the host network element sent via the security fabric; and
      validating each security check by comparing the received configuration data pertaining to each security check with a pre-defined or configurable network security configuration recommendation to generate a compliance result; and
   generating a compliance report by aggregating the compliance results obtained by executing each security check of the collection of security checks.

* * * * *